United States Patent Office 3,484,430
Patented Dec. 16, 1969

3,484,430
MIXED 1:2-CHROMIUM COMPLEX MONOAZO DYESTUFFS
Herbert Francis Andrew, and Ronald Wynford Kenyon, Manchester, England, assignors to Imperial Chemical Industries Limited, London, England, a corporation of Great Britain
No Drawing. Filed Mar. 8, 1967, Ser. No. 621,468
Claims priority, application Great Britain, Mar. 10, 1966, 10,544/66
Int. Cl. C09b 45/06; D06p
U.S. Cl. 260—145  9 Claims

ABSTRACT OF THE DISCLOSURE

Reactive, water-soluble mixed 1:2-chromium complex azo dyestuffs, the different monoazo compounds of which have the formulae:

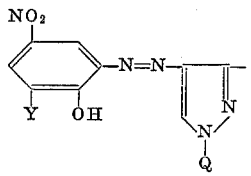

and

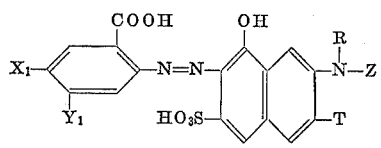

wherein Y=H or —$SO_3H$; B=a lower alkyl, —COOH or alkoxycarbonyl group; Q=H or an aryl or substituted aryl group; one of $X_1$ and $Y_1$=H and the other=H or —$SO_3H$; T=H or —$SO_3H$; R=H or a lower alkyl group and Z=a dihalogeno-s-triazinyl, a 5-cyanodihalogenopyrimidinyl or a 2,4-dihalogeno-6-A-pyrimidinyl group where A=H or a lower alkyl group; their preparation and application to leather.

---

This invention relates to new metal complex azo dyestuffs, and more particularly it relates to new reactive water-soluble 1:2-chromium complex compounds of monoazo dyestuffs containing a halogenotriazinyl or pyrimidinyl group for application to leather.

According to the invention there are provided azo dyestuffs which in the form of their free acids have the general formula

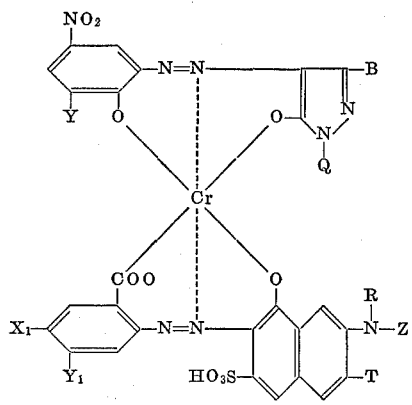

wherein Y represents a hydrogen atom or a sulphonic acid group, B represents a lower alkyl group, a carboxylic acid group or an alkoxycarbonyl group, Q represents a hydrogen atom or an aryl radical which may be substituted, one of $X_1$ and $Y_1$ represents a hydrogen atom and the other represents a hydrogen atom or a sulphonic acid group, T represents a hydrogen atom or a sulphonic acid group, R represents a hydrogen atom or a lower alkyl group and Z represents a dihalogeno-s-triazinyl group, a 5-cyano-dihalogenopyrimidinyl group or a 2,4-dihalogeno-6-A-pyrimidinyl-5-carbonyl group wherein A represents a hydrogen atom or a lower alkyl group.

As examples of the lower alkyl groups which are represented by A, B and R there may be mentioned methyl, ethyl propyl and butyl groups, but it is preferred that R represents a hydrogen atom, and when A and B represent lower alkyl groups, it is preferred that the lower alkyl group is a methyl group.

As examples of aryl radicals which are represented by Q there may be mentioned substituted or unsubstituted phenyl radicals and substituted or unsubstituted naphthyl radicals, but it is preferred that Q represents a substituted or unsubstituted phenyl radical.

As examples of substituents which may be present in the aryl radical represented by Q there may be mentioned halogen atoms, sulphonic acid groups, carboxylic acid groups, lower alkyl and lower alkoxy groups.

Throughout the specification the term "lower alkyl" or "lower alkoxy" is used to denote alkyl or alkoxy radicals containing from 1 to 4 carbon atoms and the term "halogen" is used to denote chlorine or bromine.

As examples of the groups which are represented by Z there may be mentioned 5-cyanodichloro- and 5-cyanodibromo-pyrimidinyl groups and 2,4-dichloro-, 2,4-dibromo- and 2,4-dichloro-6-methyl-pyrimidinyl-5-carbonyl groups, but it is preferred that Z represents a dihalogeno-s-triazinyl group and in particular a dichloro-s-triazinyl group.

According to a further feature of the invention there is provided a process for the manufacture of the new chromium containing azo deystuffs, as hereinbefore described, which comprises reacting the mixed chromium complex of a monoazo dyestuff of formula

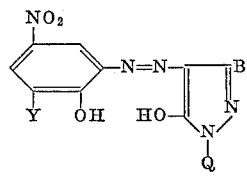

Formula I and a monoazo dyestuff of formula

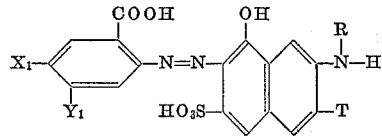

Formula II wherein B, Q, R, T, $X_1$, Y and $Y_1$ have the meanings stated above, with a cyanuric halide, a 5-cyano-2,4,6-trihalogenopyrimidine or with a 2,4-dihalogene-6-A-pyrimidine-5-carboxylic acid halide wherein A has the meaning stated above.

The mixed chromium complexes used in the above process may be obtained by general methods of the kind described and claimed in British specification No. 947,647 using the appropriate intermediates.

The monoazo compounds of Formula I may be prepared by coupling, by known methods, diazotised 2- amino-4-nitrophenol or 2-amino-4-nitrophenol-6-sulphonic acid with a 5-pyrazolone of formula

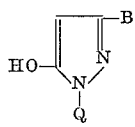

wherein B and Q have the meaning stated above.

As examples of the 5-pyrazolones which are suitable for use in the invention there may be mentioned 3-methyl-5-pyrazolone, 1-phenyl-3-methyl-5-pyrazolone, 1-(2'-, 3'- or 4'-chlorophenyl)-3-methyl-5-pyrazolone, 1-(2',5'-dichlorophenyl)-3-methyl-5-pyrazolone, 1-(2',5'-dichloro-4'-sulphophenyl)-3-methyl-5-pyrazolone, 1-(3'- or 4'-sulphophenyl)-3-methyl-5-pyrazolone, 1-(3'- or 4'-sulphophenyl)-3-carboxy-5-pyrazolone, 3-carboxy-5-pyrazolone, 1-(2'-methyl-4'-sulphophenyl)-3-methyl-5-pyrazolone, 1-phenyl-3-carboxy-5-pyrazolone, 1-(4'-sulphophenyl)-3-carboethoxy-5-pyrazolone, 1-(2',5'-dichloro-4'-sulphophenyl)-3-carboxy-5-pyrazolone, 1-(4',8'- or 6',8'-disulphonaphth-2'-yl)-3-methyl-5-pyrazolone and 1-(4',8'- or 6',8'-disulphonaphth-2'-yl)-3-carboxy-5-pyrazolone.

The monoazo compounds of Formula II may be prepared by coupling, by known methods, a diazotised amine of formula

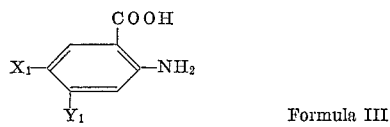

Formula III with an aminonaphthol mono- or di-sulphonic acid of formula

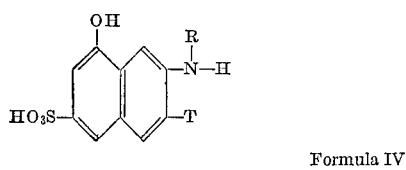

Formula IV wherein R, T, $X_1$ and $Y_1$ have the meanings stated above.

As examples of the amines of Formula III which may be used in the invention there may be mentioned anthranilic acid, 4-sulphoanthranilic acid and 5-sulphoanthranilic acid.

As examples of the aminonaphthol mono- and di-sulphonic acids of Formula IV which may be used in the invention there may be mentioned 2-amino-8-naphthol-6-sulphonic acid, 2-amino-8-naphthol-3,6-disulphonic acid, and 2-methylamno-8-naphthol-6-sulphonic acid.

The coupling of the aminonaphthol mono- and disulphonic acids of Formula IV with the diazotised amines of Formula III is carried out by known methods under such conditions that coupling occurs substantially completely at the 7-position of the naphthalene nucleus, that is at the position between the hydroxyl group and the sulphonic acid group. This may be achieved by conducting the coupling reaction under slightly acidic, neutral or preferably alkaline conditions, or preferably, the —NHR group which is present in the 2-position of the naphthalene nucleus may be acylated, for example with acetic anhydride, so that coupling in the 1-position of the naphthalene nucleus is no longer possible. After coupling has been completed, the acyl group is removed by heating the acylated aminoazo compound with dilute acid or dilute alkali, for example, dilute hydrochloric or sulphuric acid, or dilute sodium hydroxide solution.

The condensation of the 1:2 chromium complex azo intermediate containing an —NHR group with a trihalogeno-s-trazine, 5-cyano-2,4,6-trihalogenopyrimidine or dihalogenopyrimidine-5-carboxy halide may be carried out in aqueous medium, or in a mixture of water and an inert water-miscible organic solvent, for example, acetone or dioxan, advantageously in the presence of an acid binding agent for example, sodium hydroxide, sodium carbonate or sodium bicarbonate.

One method by which the condensation may be carried out comprises the addition of a neutral aqueous solution of the aminoazo chromium complex to a suspension of the halogeno compound, as hereinbefore defined, in water or in a mixture of water and an inert water-miscible organic solvent, for example, acetone or dioxan. In the case of a trihalogeno-s-triazine or a dihalogenopyrimidine-5-carboxy halide the reaction temperature is advantageously kept low, for example, at 0° to 5° C. When using a 5-cyano-2,4,6-trihalogenopyrimidine, however, higher temperatures, for example, from 15° to 90° C. may be used. During the reaction, the pH of the mixture is advantageously held near the neutral point, for example, between pH 5.0 and pH 8.0, but it is preferred that the pH should be maintained between 6.0 and 7.0. The pH is held within the desired range by addition of an acid binding agent as hereinbefore defined, if desired in the form of an aqueous solution, and reaction is deemed to be complete when no further addition of acid binding agent is necessary to maintain the pH within the desired range.

It is of course necessary to use at least one mole of the halogeno compound for each mole of the 1:2-chromium complex aminoazo intermediate, but it is convenient to use a moderate excess of the halogeno compound in order to ensure complete reaction of the aminoazo intermediate. Any unreacted halogeno compound which may be present after all the aminoazo intermediate has reacted may be removed from the reaction mixture by filtration and before isolation of the dyestuff.

When reaction between the 1:2-chromium complex aminoazo compound and the halogeno compound is complete, the dyestuff may be isolated, advantageously at a low temperature, by salting the solution with, for example, potassium chloride or sodium chloride.

If desired, the filtered dyestuff, as hereinbefore defined, may be dried in the presence of a stabiliser in order to minimise any decomposition which may occur during the drying process. As examples of stabilisers which may be used for this purpose there may be mentioned stabilisers derived from phosphates such as sodium dihydrogen phosphate and disodium hydrogen phosphate and/or the corresponding potassium salts and mixtures thereof. The use of such stabilisers is described in British specification No. 838,337. Other stabilisers may be used, for example, citrates such as sodium citrate, borates, and alkali metal salts of dialkylmetanilic acids such as sodium diethylmetanilate, which are preferably used in conjunction with sodium hydrogen sulphate.

The drying of the dyestuffs is adavntageously carried out at ordinary temperatures or at moderately elevated temperatures and under reduced pressure.

The aqueous suspension of the halogeno compound used in the reaction hereinbefore described may be obtained by adding the finely divided compound to water, or to water containing a dispersing agent which does not enter into reaction with the halogeno compound, or by pouring a solution of the halogeno compound in an inert, water-miscible organic solvent, for example, acetone or dioxan, into water, or ice, or a mixture of water and ice.

The condensation of the 1:2-chromium complex aminoazo compound with the halogeno compound may also be carried out by adding a solution of the halogeno compound in an inert, water-miscible organic solvent to an aqueous solution of the 1:2-chromium complex aminoazo compound and maintaining the conditions of temperature and pH described previously until the reaction is complete.

The dyestuffs of the present invention are applied to leather from an aqueous dyebath, advantageously in the presence of salt. The concentration of salt in the dyebath may be varied within wide limits, for example, from 1 to 10% by weight of the dyebath, but it is preferred that a salt concentration of about 8% should be used.

The dyestuffs are applied in the presence of an alkali, for example, sodium carbonate, in order to neutralise the acid which is liberated in the reaction between the dyestuff and the leather. It is desirable to use the minimum quantity of alkali necessary to give a substantially neutral dyebath at the completion of the dyeing operation.

The temperature at which the dyeing is carried out may be varied within wide limits. For example, temperatures varying from ordinary temperature up to 70° C. may be used, but it is preferred that a temperature of from 50° to 60° C. should be used.

The leather to be dyed is first thoroughly soaked in warm water, advantageously containing a low concentration of ammonia sufficient to neutralise the leather to a pH of 7.5–8.0.

The leather is washed well, drained, and suspended in water at about 55° C. The quantity of water is not critical, and is conveniently 600–800% of the dry weight of the leather. The necessary quantity of salt is added to give a solution of the desired strength, allowance being made if necessary for quantity of water retained by the wet leather and the water which is to be added in the form of the dyestuff solution. The dyestuffs solution is added, and the dyebath is agitated for a short time. The requisite quantity of alkali is then added, followed by further agitation for sufficient time to allow maximum penetration and fixation of the dyestuff. The time necessary for penetration and fixation is variable and depends on the reactivity of the dyestuff and the particular leather being dyed, but a time of from 15 minutes to 1½ hours is normally sufficient. The dyed leather is then washed in cold running water to remove any unfixed dyestuff and salt, and is then ready for such further treatment as may be necessary.

When the dyeing of chrome-tanned lambskins is being carried out, it is preferred to perform the dyeing at room temperature in the absence of salt in order that staining of the wool is reduced to a minimum, but if slight staining is not objectionable, then the normal dyeing process, as hereinbefore defined, may be used.

The dyestuffs of this invention have properties making them particularly valuable for the dyeing of leather. Whilst it is known that the commercially available dichlorotriazine and pyrimidine dyestuffs, developed primarily for the colouration of cellulose textile materials, can be used for colouring leather, the properties necessary to achieve good result on cellulose differ markedly in a number of respects from those advantageous for leather. One important property is penetration of the leather during dyeing. A surface-dyeing dyestuff suffers from the disadvantage that the buffing treatments which may subsequently be given to the leather gives rise to variation in shade. On the other hand a highly penetrative dyestuff gives only weak shades. The dyestuffs of the present invention, however, whilst having all the advantages available in commercially available reactive dyestuffs, can also adequately penetrate the leather whilst still giving strong shades having excellent fastness to washing and to light. It is a further advantage that these dyestuffs also build up well on leather, have good stability to changes in pH and possess excellent reserve of wool when applied to suede-back wool skins by an immersion technique. By reserve of wool is meant that when applied to woolled sheepskins the leather is dyed with little or no staining of the wool.

The invention is illustrated but not limited by the following examples in which the parts and percentages are by weight:

EXAMPLE 1

A neutral solution prepared by dissolving a mixture of 0.02 g. mol of the 1:1-chromium complex of the monoazo compound 1 - (4'-sulphophenyl)-3-methyl-4-(2''-hydroxy-5''-nitro-3''-sulphophenylazo)-5-pyrazolone and 0.02 g. mol of the monoazo compound 2-amino-7-(2'-carboxylphenylazo)-8-naphthol-6-sulphonic acid in 380 parts of water is heated at 90°–95° C. and at pH 7 for 4 hours.

The resulting solution of the mixed chromium complex, after being cooled in an ice-bath to 0° C., is added to a suspension of 3.7 parts of cyanuric chloride in 25 parts of acetone 50 parts of water and 50 parts of ice. The mixture is stirred at 0–5° C. for 1 hour then neutralised to pH 6.8 by the addition of a 10% aqueous solution of sodium carbonate. The solution of dichlorotriazine derivative is saturated with sodium chloride and the precipitated metalliferrous compound is filtered off. The filtercake is pasted with 4 parts of a mixture composed of 2 parts of disodium hydrogen phosphate and 3.5 parts of potassium dihydrogen phosphate and is then dried.

The dyestuff composition so obtained contains 1.9 atoms of hydrolysable chlorine per molecule. When applied to suede-back woolskins by an immersion technique, the dye yields attractive brown shades having excellent reserve of the wool and good light and washing fastness.

The following table gives the shades of further examples of the new dyestuffs of the invention which are obtained by the general method of Example 1 by condensing the 1:2-chromium complex obtained from the compounds of columns 2 and 3, with the heterocyclic compound named in column 4 of the table.

| Ex. | 1:1-chromium complex | Monoazo compound | Heterocyclic compound | Shade |
|---|---|---|---|---|
| 2 | 1:1-Cr complex of 1-(4'-sulphophenyl)-3-methyl-4(2''-hydroxy-5''-nitro-3''-sulphophenylazo)-5-pyrazolone. | 2-N-methylamino-7-(2'-carboxyphenyl-azo)-8-naphthol-6-sulphonic acid. | Cyanuric chloride | Brown |
| 3 | 1:1-Cr complex of 1-phenyl-3-methyl-4-(2''-hydroxy-5''-nitro-3''-sulphophenylazo)-5-pyrazolone. | 2-amino-7-(2'-carboxy-4'-sulphophenylazo)-8-naphthol-6-sulphonic acid. | do | Do. |
| 4 | 1:1-Cr complex of 1-(4'-sulpho-2':5'-dichlorophenyl)-3-methyl-4-(2''-hydroxy-5''-nitro-3''-sulphophenylazo)-5-pyrazolone. | 2-amino-7-2'(-carboxyphenylazo)-8-naphthol-6-sulphonic acid. | do | Do. |
| 5 | 1:1-Cr complex of 1-(4'-sulphophenyl)-3-methyl-4(2''-hydroxy-5''-nitro-3''-sulphophenylazo)-5-pyrazolone. | 2-amino-7-(2'-carboxyphenylazo)-8-naphthol-3:6-disulphonic acid. | do | Do. |
| 6 | 1:1-Cr complex of 1-(phenyl-3-methyl-4-(2''-hydroxy-5''-nitro-3''-sulphophenylazo)-5-pyrazolone. | 2-amino-7-(2'-carboxy-4'-sulphophenylazo)-8-naphthol-6-sulphonic acid. | 5-cyano-2:4:6-trichloropyrimidine. | Do. |
| 7 | 1:1-Cr complex of 1-(4'-sulpho-2':5'-dichlorophenyl)-3-methyl-4-(2''-hydroxy-5''-nitro-3''-sulphophenylazo)-5-pyrazolone. | 2-amino-7-(2'-carboxyphenylazo)-8-naphthol-6-sulphonic acid. | Cyanuric bromide | Do. |
| 8 | 1:1-Cr complex of 1-(4'-sulphophenyl)-3-methyl-4-(2''-hydroxy-5''-nitrophenylazo)-5-pyrazolone. | 2-amino-7-(2'-carboxy-4'-sulphophenylazo)-8-naphthol-6-sulphonic acid. | Cyanuric chloride | Do. |
| 9 | 1:1-Cr complex of 1-phenyl-3-methyl-4-(2'-hydroxy-5'-nitro-3'-sulphophenylazo)-5-pyrazolone. | 2-amino-7-(2'-carboxy-5'-sulphophenylazo)-8-naphthol-6-sulphonic acid. | do | Do. |
| 10 | do | 2-amino-7-(2'-carboxy-4'-sulphophenylazo)-8-naphthol-6-sulphonic acid. | 2,4-dichloropyrimidine-5-carboxylic acid chloride. | Do. |
| 11 | 1:1-Cr complex of 1-(2'-methyl-4'-carboxyphenyl)-3-methyl-4-(2'-hydroxy-5'-nitro-3'-sulphophenylazo)-5-pyrazolone. | 2-N-butylamino-7-(2'-carboxy-5'-sulphophenylazo)-8-naphthol-6-sulphonic acid. | 5-cyano-2,4,6-tribromopyrimidine. | Do. |
| 12 | 1:1-Cr complex of 1-(4',8'-disulphonaphth-2'-yl)-3-methyl-4-(2'-hydroxy-5'-nitro-3'-sulphophenylazo)-5-pyrazolone. | 2-amino-7-(2'-carboxy-4'-sulphophenylazo)-8-naphthol-6-sulphonic acid. | 2,4-dichloro-6-methyl-pyrimidine-5-carboxylic acid chloride. | Do. |

We claim:
1. 1:2 chromium complex azo dyestuffs which in the form of their free acids have the general formula

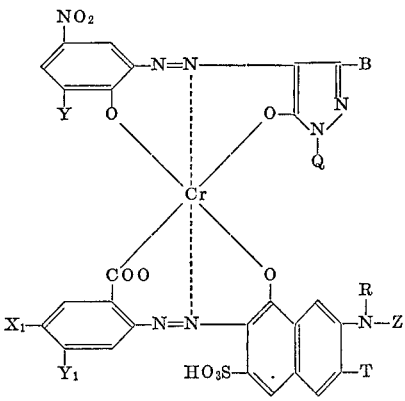

wherein Y represents a hydrogen atom or a sulphonic acid group, B represents a lower alkyl group, a carboxylic acid group or an ethoxycarbonyl group, Q represents a hydrogen atom, unsubstituted phenyl or naphthyl groups and phenyl or naphthyl groups substituted with a member selected from the group consisting of sulpho, chloro, methyl or carboxy radicals, one of $X_1$ and $Y_1$ represents a hydrogen atom and the other represents a hydrogen atom or a sulphonic acid group, T represents a hydrogen atom or a sulphonic acid group, R represents a hydrogen atom or a lower alkyl group and Z represents the dihalogeno-s-triazinyl group, the 5-cyano-dihalogenopyrimidinyl group or the 2,4-dihalogeno-6-A-pyrimidinyl-5-carbonyl group wherein A represents a hydrogen atom or a lower alkyl group, wherein halogeno is chlorine or bromine.

2. Azo dyestuffs as claimed in claim 1 wherein Q represents a phenyl radical substituted with a member selected from the group consisting of sulpho, chloro, methyl or carboxy radicals.

3. Azo dyestuffs as claimed in claim 1 wherein Z represents the dichloro-s-triazinyl group.

4. Azo dyestuffs as claimed in claim 1 wheren B represents a methyl group.

5. Azo dyestuffs as claimed in claim 1 wheren R represents a hydrogen atom.

6. Azo dyestuffs as claimed in claim 1 wherein Q represents an unsubstituted phenyl radical.

7. An azo dyestuff as claimed in claim 1 having the formula:

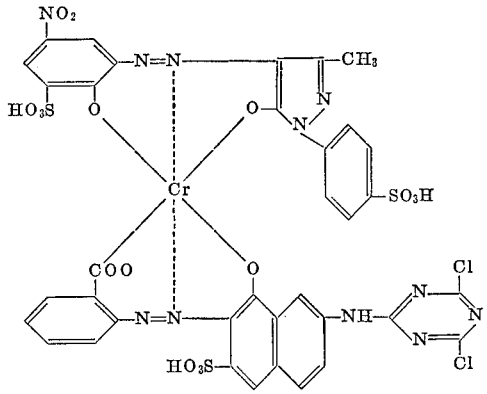

8. An azo dyestuff as claimed in claim 1 having the formula:

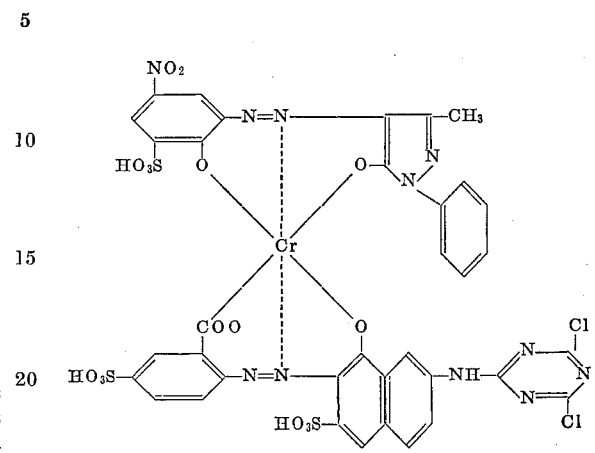

9. An azo dyestuff as claimed in claim 1 having the formula:

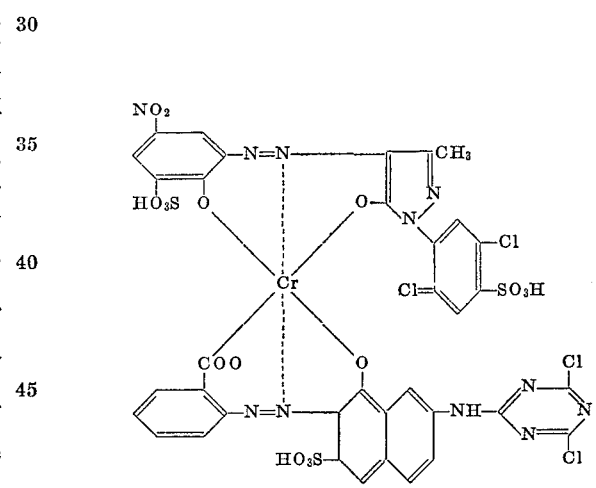

References Cited
FOREIGN PATENTS
1,373,757 8/1964 France.

CHARLES B. PARKER, Primary Examiner

DONALD M. PAPUGA, Assistant Examiner

U.S. Cl. X.R.

8—13, 42, 54; 260—146, 147, 153, 154, 163, 198, 310